United States Patent Office 2,735,830
Patented Feb. 21, 1956

2,735,830

POLYMERIZATION OF ACRYLONITRILE IN THE PRESENCE OF N-VINYL ACYLAMIDE POLYMERS

Harry W. Coover, Jr., Kingsport, Tenn., assignor to Eastman Kodak Company, Rochester, N. Y., a corporation of New Jersey No Drawing. Application October 21, 1952,
Serial No. 316,064

16 Claims. (Cl. 260—45.5)

This invention relates to the polymerization of acrylonitrile in the presence of preformed polymers of N-vinyl amides including N-vinyl acylamides, and to articles obtained therefrom.

It has been previously proposed to polymerize acrylonitrile in the presence of polyvinyl resins, such as polyvinyl acetate (U. S. Patent 2,123,599, dated July 12, 1938). The polymers obtained according to the suggested method in U. S. Patent 2,123,599 can be used to prepare synthetic fibers, which are susceptible to many of the known organic dyes. A serious drawback with this method is that the fibers thus obtained have too low a softening temperature to be of commercial value, softening being observed at temperatures as low as 145° C.

Attempts have been made to increase the dyeability of polyacrylonitrile fibers by interpolymerizing acrylonitrile with certain monomers whose polymers have an affinity for dyes. While this procedure does give polymer products, from which fibers having good dyeing properties can be obtained, a serious drawback, such as that mentioned above, arises in certain instances, a substantial lowering of the softening point of the fiber being observed. For example, while an interpolymer of acrylonitrile and vinyl acetate containing about 80 percent by weight of acrylonitrile can be drawn into fibers susceptible to dyeing, the softening point of such fibers is too low for practical purposes, softening of the fibers being observed at about 150°–170° C.

Other attempts have been made to increase the dyeability of polyacrylonitrile fibers by mixing with the polyacrylonitrile, before spinning, other polymeric materials which are dye susceptible. This procedure likewise provides fibers having good dyeing properties, however, many of these fibers show a low softening point, and in addition many show segmentation into their individual components along their horizontal axis. For example, it can be demonstrated that mixtures of polyvinyl acetate and polyacrylonitrile, when dissolved in either N,N-dimethylformamide or N,N-dimethylacetamide in proportions varying from 15 to 50 percent by weight of polyvinyl acetate based on the total weight of the mixed polyacrylonitrile and polyvinyl acetate, form grainy dopes which separate into two liquid layers on standing. This is also true of many other polymeric compounds, natural or synthetic, which are soluble in the above solvents. Fibers which form from these non-homogenous solutions or mixtures of polyacrylonitrile and polyvinyl acetate are too low in softening temperature to be of practical value, and also are subject to the defect of segmentation. This is not surprising because of the non-homogenous condition of the spinning solution and the fact that it is generally known that polyacrylonitrile is not compatible with many organic substances.

I have now made the unusual and valuable discovery that stable solutions of acrylonitrile polymers which do not separate into distinct layers on standing, and from which fibers of homogeneous character can be spun, can be prepared by polymerizing acrylonitrile, or acrylonitrile together with another monoethylenically unsaturated and polymerizable monomer, in the presence of certain "live" preformed polymers and interpolymers of N-vinyl amides including N-vinyl acylamides, i. e. polymers which have not been separated from their polymerization reaction mixtures prior to the addition of the monomeric acrylonitrile. These fibers are characterized by a softening point higher than the interpolymers referred to above, and do not exhibit the segmentation defect shown by many of the fibers prepared from certain prior art materials comprising polyacrylonitrile.

It is known that polymers of acrylonitrile can be prepared by interpolymerizing acrylonitrile with a monoethylenically unsaturated compound and adding additional acrylonitrile during the course of the polymerization. The interpolymers thus obtained are subject to many of the deficiencies of the interpolymers referred to above in that their softening points are too low to permit their use in the preparation of synthetic fibers and yarns. My new resinous compositions or polymers are distinguished therefrom in that the polymerization of the original polymerization mixture of my invention is substantially complete before the added acrylonitrile, or added mixture of acrylonitrile and another monoethylenically unsaturated monomer, are subjected to polymerization conditions. The acrylonitrile and the other monomer are thus able to extend the length of the polymer chain with units consisting entirely of acrylonitrile or of acrylonitrile and the other monomer in probably a copolymeric relation, and the products have the valuable tenacity and high-softening properties of polyacrylonitrile, while the new and important property of dye susceptibility is imparted thereto. Those resinous compositions of my invention which are prepared by copolymerizing a mixture of acrylonitrile and another monomer in the presence of the preformed polymers have the additional valuable property of greater solubility in acrylonitrile polymer solvents so that flowable solutions or dopes having polymer solids content of 25 to 40 percent or even higher, without any gelling, can be obtained with these polymers of the invention.

Furthermore, the dopes are spinnable at temperatures substantially below 100° C. and the filaments and fibers obtained are greatly improved in color, in contrast to the other polymers of the invention which give high quality compositions and fibers, but which ordinarily can be used only at maximum solution concentrations of about 20 percent so as to be readily filterable, and require higher spinning temperatures, i. e. 110° C. or even higher, tending to give discolored fibers. The fibers obtained from the resinous compositions resulting from copolymerizing acrylonitrile and another monomer in the presence of preformed polymers also show better extensibility, i. e. an extensibility in the range of 40–50 percent and still retaining tenacity in the order of 2.5–3.0 grams per denier, whereas the other polymers of my invention, for example, those prepared by homopolymerizing acrylonitrile in the presence of similar preformed polymers, also show good extensibility but not exceeding 30 percent for the same range of tenacity.

It is, accordingly, an object of the invention to provide a new class of modified acrylonitrile compositions or polymers. Another object is to provide a process for preparing these resinous compositions. Still another object is to provide homogeneous solutions of these resinous compositions. A further object is to provide high quality fibers from the compositions and their solutions. Other objects will become apparent hereinafter.

In accordance with the invention, I prepare my resinuous compositions or polymers by polymerizing, by heating in the presence of a polymerization catalyst, a dispersion of from 50 to 95, but preferably from 60 to 95, parts by weight of acrylonitrile, or a mixture of monomers consisting of from 85.0 to 99.5 percent by weight of acrylonitrile and from 15.0 to 0.5 percent by weight of a different monoethylenically unsaturated, polymerizable compound containing a

I.      —CH=C< group, or more especially a

II.      CH$_2$=C< group, in the presence of from 50 to 5, but preferably 45 to 5, parts by weight of a "live" modifying homopolymer or copolymer, i. e. a completely polymerized polymer of an N-vinyl amide or acylamide which has not been separated from its polymerization reaction mixture, the said copolymer containing from 50 to 95 percent by weight of an N-vinyl amide or acylamide and from 50 to 5 percent by weight of a different monoethylenically unsaturated, polymerizable compound, until the monomers have substantially completely polymerized, i. e. 90 percent or more of the monomers have completely polymerized. The polymerizations are carried out ordinarily in an aqueous medium by simply heating in the presence of a polymerization catalyst a dispersion of the stated proportions of the monomeric N-vinyl amide or acylamide or its admixture with the other different monomer, until the monomer or monomers are completely polymerized, then without separating the "live" polymer produced from the polymerization mixture, there is added to the reaction mixture the stated amount of acrylonitrile or acrylonitrile plus the other monomer, and the heating continued until the added monomer or monomers have substantially polymerized.

An alternate method for preparing generally similar compositions or polymers is by a "reverse" process, i. e. by first polymerizing completely the stated amount of acrylonitrile or acrylonitrile plus the other monomer to the homopolymer and copolymer, respectively, and then without separating the "live" polymer from its polymerization reaction mixture, adding to the reaction mixture the stated amount of an N-vinyl amide or acylamide or an N-vinyl amide or acylamide plus the other different monomer, and heating the reaction mixture until the added monomer or monomers have substantially polymerized.

The N-vinyl amides or acylamides whose polymers can be advantageously used in practicing my invention comprise N-vinyl succinimide and those represented by the following general formulas:

III.

$$CH_2=CH-N-\underset{R_1}{\overset{\overset{\displaystyle O}{\|}}{C}}-R$$

IV.

$$CH_2=CH-N-\underset{\underset{R_1}{|}}{\overset{\overset{\displaystyle O}{\|}}{\underset{O=C}{C}}}-R$$

wherein R and R$_1$ each represents an alkyl group containing from 1 to 3 carbon atoms (e. g. methyl, ethyl, propyl and isopropyl groups) and a phenyl group. Typical N-vinyl amides and acylamides include N-vinyl-N-methylacetamide, N-vinyl-N-ethyl acetamide, N-vinyl-N-propyl acetamide, N-vinyl-N-methyl propionamide, N-vinyl-N-ethyl propionamide, N-vinyl-N-propyl propionamide, N-vinyl-N-methyl butyramide, N-vinyl-N-ethyl butyramide, N-vinyl-N-propyl butyramide, N-vinyl diacetamide, N-vinyl-N-propionylacetamide, N-vinyl-N-butyrylacetamide, N-vinyl-N-dipropionamide, N-vinyl-N-dibutyramide, N-vinyl succinimide, N-vinyl-N-phenyl acetamide, N-vinyl-N-methyl benzamide, etc.

The monoethylenically unsaturated, polymerizable organic compounds represented by Formulas I and II above include N-vinyl succinimide and the compounds represented by Formulas III and IV, in addition to other monomeric compounds coming within the scope thereof, such as styrene, α-methylstyrene, p-acetamino-styrene, α-acetoxystyrene, vinyl chloride, vinylidene chloride, ethyl vinyl ether, isopropyl vinyl ether, isopropenyl methyl ketone, ethyl isopropenyl ketone, methyl vinyl ketone, ethyl vinyl ketone, dimethyl maleate, diethyl maleate, diisopropyl maleate, dimethyl fumarate, diethyl fumarate, diisopropyl fumarate, acrylic acid, methacrylic acid, fumaronitrile, acrylonitrile, methacrylonitrile, N-vinyl phthalimide, vinyl sulfonamide acrylonitrile, acrylamides such as acrylamide, methacrylamide, N-methyl acrylamide, N-methyl methacrylamide, N, N-dimethyl acrylamide, etc., maleamides and fumaramides such as maleamide, N, N-dimethyl maleamide, N, N-diethyl maleamide, fumaramide, N, N-dimethyl fumaramide, N,N-diethyl fumaramide, etc., itaconamides such as itaconamide, N-methyl itaconamide, N-ethyl itaconamide, N,N'-dimethyl itaconamide, etc., citraconamides such as citraconamide, N-methyl citraconamide, N,N'-diethyl citraconamide, N,N,N',N'-tetramethyl citraconamide, maleamates, fumaramates, itaconamates, citraconamates, alkyl esters of acrylic and methacrylic acids, vinyl carboxylic acid esters such as vinyl acetate, vinyl butyrate, etc.

The polymerizations can be accelerated by the use of well-known polymerization catalysts commonly used in the art of polymerization, and my invention is not to be limited to any particular catalyst material. Catalysts which I have found particularly useful comprise the peroxide polymerization catalysts such as organic peroxides (e. g. benzoyl peroxide, acetyl peroxide, lauryl peroxide, urea peroxide, triacetone peroxide, alkyl percarbonates, tert. butyl hydroperoxide, etc.), hydrogen peroxide, perborates (e. g. alkali metal perborates such as sodium and potassium perborates, ammonium perborate, etc.) persulfates (e. g. alkali metal persulfates such as sodium and potassium persulfates, ammonium persulfate, etc.). Other catalysts such as the ketazines, azines, etc. can be used. The amount of catlyst used can be varied depending on the monomer, amount of diluent, etc. The catalyst can be added in amount sufficient to complete both steps of my polymerization process or added stepwise, i. e. an amount sufficient to complete only the first step of polymerization in which the "live" polymer is formed, additional catalyst being then added with the added monomers to complete polymerization of the added monomers in the second and final step of polymerization. The latter procedure provides a readier means for regulating the molecular weight distribution of the polymer composition.

The temperatures at which the process of our invention can be carried out vary from ordinary room temperature to the reflux temperature of the reaction mixture. Generally, a temperature of from 25° to 75° C. is sufficient.

If desired, emulsifying agents can be added to the reaction mixture to distribute uniformly the reactants throughout the reaction medium. Typical emulsifying agents include the alkali metal salts of certain alkyl acid sulfates (e. g. sodium lauryl sulfate), alkali metal salts of aromatic sulfonic acids (sodium isobutylnaphthalenesulfonate), alkali metal or amine addition salts of sulfosuccinic acid esters, alkali metal salts of fatty acids containing from 12 to 20 carbon atoms, sulfonated fatty acid amides, alkali metal salts of alkane sulfonic acids, sulfonated ethers (e. g. aryloxy polyalkylene ether sulfonates, such as Triton 720), etc.

The polymerization can be carried out in the presence of chain regulators, such as hexyl, octyl, lauryl, dodecyl, myristyl mercaptans, etc., which impart improved solubility properties to the polymer compositions. If desired, reducing agents such as alkali metal bisulfites (e. g.

potassium, sodium, etc. bisulfites) can be added to reduce the time required for the polymerization to be effected.

The following examples will serve to illustrate further the manner whereby I practice my invention.

Example No. 1

Five grams of N-vinylsuccinimide was emulsified in 100 ml. of water containing 0.1 g. ammonium persulfate and 0.5 ml. of Tergitol No. 4. The emulsion was tumbled 24 hours at 45° C. The resulting emulsion was cooled at 25° C. and 15 g. of acrylonitrile was added along with 0.1 g. ammonium persulfate and 0.1 g. sodium bisulfite and tumbled 16 hours at 35° C. The resultant polymer contained approximately 24 percent N-vinylsuccinimide by analysis and was soluble in such solvents as dimethylacetamide and dimethylformamide. Fibers obtained from the polymer had a softening point above 200° C. and showed excellent affinity for acetate, wool, direct, and vat dyes.

Example No. 2

Two grams of N-vinyl-N-methylacetamide and 2 g. of acrylonitrile were added to 100 ml. of distilled water containing 0.1 g. of ammonium persulfate and 0.5 ml. Tergitol No. 4. The solution was tumbled 24 hours at 50° C. The resulting emulsion was cooled to room temperature and 6 g. acrylonitrile was added along with 0.1 g. ammonium persulfate and 0.1 g. sodium bisulfite, and tumbled 16 hours at 35° C. The resultant polymer was soluble in such solvents as dimethylacetamide and dimethylformamide. Fibers obtained from the polymer had a softening temperature above 200° C. and showed excellent affinity for acetate, direct, wool, and vat dyes.

Example No. 3

Two grams N-vinyl-N-methylacetamide and 1 g. N-vinylphthalimide were added to 100 ml. distilled water containing 0.1 g. of ammonium persulfate, 0.1 g. sodium bisulfite, and 0.5 ml. Tergitol No. 4. The emulsion was tumbled 24 hours at 50° C. The emulsion was cooled to room temperature and 7 g. acrylonitrile was added along with 0.1 g. ammonium persulfate and 0.1 g. sodium bisulfite and tumbled 16 hours at 35° C. The isolated polymer contained approximately 28 percent modifier by analysis and was soluble in such solvents as dimethylformamide and γ-butyrolactone. Fibers obtained from this polymer had a softening point above 200° C. and showed excellent affinity for direct, wool, acetate, and vat dyes.

Example No. 4

Three grams of N-vinyldiacetamide was added to 100 ml. distilled water containing 0.06 g. ammonium persulfate, 0.06 g. sodium bisulfite and 0.5 ml. Tergitol No. 4. The emulsion was tumbled at 35° C. for 12 hours. The emulsion was cooled and 7 g. of acrylonitrile was added along with 0.1 g. of ammonium persulfate and 0.1 g. of sodium bisulfite, and tumbled for 12 hours at 40° C. The resultant polymer was soluble in such solvents as dimethylacetamide and dimethylformamide. Fibers obtained from the polymer had a softening point above 200° C. and showed excellent affinity for acetate, wool, direct, and vat dyes.

Example No. 5

5 grams of N-vinyl succinimide was emulsified in 100 milliliters of water containing 0.1 gram of ammonium persulfate and 0.5 milliliter of Tergitol No. 4 (7-ethyl-2-methyl undecane-4-sulfonic acid sodium salt). The emulsion was tumbled 24 hours at 45° C. The resulting emulsion was cooled to 25° C. and 14.2 grams of acrylonitrile and 0.8 gram of vinyl acetate were added along with 0.1 gram of ammonium persulfate and 0.1 gram of sodium bisulfite and tumbled 16 hours at 35° C. The resultant polymer contained approximately 24 percent N-vinyl succinimide by analysis and was soluble in such solvents as dimethylacetamide and dimethylformamide. Fibers obtained from the polymer had a softening point above 200° C. and showed excellent affinity for acetate, wool, direct and vat dies.

Example No. 6

2 grams of N-vinyl N-methylacetamide and 2 grams of acrylonitrile were added to 100 milliliters of distilled water containing 0.1 gram of ammonium persulfate and 0.5 milliliters of Tergitol No. 4 (7-ethyl-2-methyl undecane-4-sulfonic acid sodium salt). The solution was tumbled for 24 hours at 50° C. The resulting emulsion was cooled to room temperature and 5.7 grams of acrylonitrile and 0.3 gram of methyl acrylate were added along with 0.1 gram of ammonium persulfate and 0.1 gram of sodium bisulfite and tumbled 16 hours at 35° C. The resultant polymer was soluble in such solvents as dimethylacetamide and dimethylformamide. Fibers obtained from the polymer had a softening point above 200° C. and showed excellent affinity for acetate, direct, wool and vat dyes. The polymer can be mixed with polyacrylonitrile or copolymers of acrylonitrile containing 85 percent or more acrylonitrile in all proportions and dissolved to give stable solutions which do not separate into distinct layers on standing and from which fibers and films of homogeneous character can be spun, extruded or cast.

Example No. 7

2 grams of N-vinyl n-methylacetamide and 1 gram of N-vinyl phthalimide were added to 100 milliliters of distilled water containing 0.1 gram of ammonium persulfate and 0.1 gram of sodium bisulfite and 0.5 milliliter of Tergitol No. 4 (7-ethyl-2-methyl undecane-4-sulfonic acid sodium salt). The emulsion was tumbled 24 hours at 50° C. The emulsion was cooled to room temperature and 6.3 grams of acrylonitrile and 0.7 gram of N-methylacrylamide were added along with 0.1 gram of ammonium persulfate and 0.1 gram of sodium bisulfite and tumbled 16 hours at 35° C. The isolated polymer contained approximately 28 percent of the amide modifiers by analysis and was soluble in such solvents as dimethylformamide and γ-butyrolactone. Fibers obtained from this polymer had a softening point above 200° C. and showed excellent affinity for direct, wool, acetate and vat dyes.

Example No. 8

3 grams of N-vinyl diacetamide were added to 100 milliliters of distilled water containing 0.06 gram of ammonium persulfate, 0.06 gram of sodium bisulfite and 0.7 milliliter of Tergitol No. 4 (7-ethyl-2-methyl undecane-4-sulfonic acid sodium salt). The emulsion was tumbled at 35° C. for 3 hours. The emulsion was cooled and 7 grams of acrylonitrile were added along with 0.1 gram of ammonium persulfate, 0.1 gram of sodium bisulfite and 0.1 gram of N-vinyl diacetamide. The emulsion was tumbled for an additional 12 hours at 40° C. The resultant polymer was soluble in such solvents as dimethylacetamide and dimethylformamide. Fibers obtained from the polymer had a softening point above 200° C. and showed excellent affinity for acetate wool direct and vat dyes. The polymer can be mixed with polyacrylonitrile or copolymers of acrylonitrile containing 85 percent or more acrylonitrile in all proportions and dissolved to give clear stable solutions which do not separate into distinct layers on standing, and from which fibers and films of homogeneous character can be spun, extruded or cast. Fibers obtained from a solution of a mechanical mixture of 95 parts polyacrylonitrile and 5 parts of the above polymer and extruding the solution into a precipitating bath had a tenacity of 3.5 grams per denier and a softening point above 200° C. The fibers showed good affinity for direct, wool, acetate and vat dyes.

Example No. 9

0.5 gram of N-vinyl diacetamide was added to 100 milliliters of distilled water containing 0.01 gram of ammonium persulfate, 0.01 gram of sodium bisulfite and 0.5 milliliter of Tergitol No. 4 (7-ethyl-2-methyl undecane-4-sulfonic acid sodium salt). The emulsion was tumbled at 35° C. for 6 hours. The emulsion was cooled and 9.5 grams of acrylonitrile were added along with 0.1 gram of ammonium persulfate and 0.1 gram of sodium bisulfite and tumbled for 12 hours at 40° C. The resultant polymer was obtained in a 96 percent yield and contained approximately 5 percent by weight of N-vinyl diacetamide. Fibers obtained from the polymer had a softening point above 200° C. and showed good affinity for acetate wool direct and vat dyes. Fibers obtained from a solution of a mechanical mixture of 5 parts polyacrylonitrile and 95 parts of the above polymer and extruding the solution into a precipitating bath had a softening point above 200° C. and showed fair affinity for direct, wool, acetate and vat dyes.

Example No. 10

1 gram of N-vinyl succinimide was added to 80 milliliters of distilled water containing 0.03 gram of ammonium persulfate, 0.03 gram of sodium bisulfite and 0.7 milliliter of Tergitol No. 4 (7-ethyl-2-methyl undecane-4-sulfonic acid sodium salt). The emulsion was tumbled at 35° C. for 6 hours. The emulsion was cooled and 8.5 grams of acrylonitrile and 0.5 gram of methyl fumaramate were added along with 0.1 gram of ammonium persulfate and 0.1 gram of sodium bisulfite and tumbled for 8 hours at 35° C. The resultant polymer was obtained in a 97 percent yield and contained approximately 10 percent N-vinyl succinimide on analysis. Fibers obtained from the polymer had a softening point above 200° C. and showed excellent affinity for acetate, wool, direct and vat dyes. The polymer was readily soluble in such solvents as dimethylacetamide, dimethylformamide, γ-butyrolactone, etc. Fibers obtained from a solution of a mechanical mixture of 60 parts of the above polymer and 40 parts of acrylonitrile polymer containing 95 percent acrylonitrile and 5 percent vinyl acetate and extruding the solution into a precipitating bath had a softening point above 200° C. and showed excellent affinity for acetate, direct, wool and vat dyes.

Example No. 11

8.5 grams of N-vinyl N-methylacetamide and 1 gram of dimethylfumarate were added to 100 milliliters of distilled water containing 0.1 gram of ammonium persulfate, 0.1 gram of sodium bisulfite along with 1 milliliter of Triton 720 (a sulfonated ether). The emulsion was tumbled for 24 hours at 45° C. The resulting emulsion was cooled to room temperature and 0.5 gram of acrylonitrile was added along with 0.01 gram of ammonium persulfate and 0.01 gram of sodium bisulfite and tumbled an additional 8 hours at 35° C. The resultant polymer was soluble in such solvents as dimethylacetamide and dimethylformamide. The polymer could be mixed with polyacrylonitrile or copolymers of acrylonitrile containing 85 percent or more acrylonitrile in all proportions and dissolved to give stable solutions which do not separate into distinct layers on standing and from which fibers and films of homogeneous character can be spun, extruded or cast. Fibers obtained from a solution of a mechanical mixture of 75 parts polyacrylonitrile and 25 parts of the above polymer had a softening point above 200° C. and showed excellent affinity for acetate, direct, vat and wool dyes.

Example No. 12

2 grams of vinyl acetate and 2 grams of N-vinyl phthalimide were added to 90 milliliters of distilled water containing 0.15 gram of ammonium persulfate and 0.15 gram of sodium bisulfite along with 1 milliliter of Tergitol No. 4 (7-ethyl-2-methyl undecane-4-sulfonic acid sodium salt). The emulsion was tumbled for 24 hours at 35° C. The emulsion was then cooled to room temperature and 5.8 grams of acrylonitrile and 0.2 gram of N-vinyl succinimide were added along with 0.1 gram of ammonium persulfate and 0.05 gram of sodium bisulfite and tumbled 8 hours at 35° C. The resultant polymer was obtained in a 93 percent yield and contained approximately 58 percent acrylonitrile on analysis. Fibers obtained from a solution of a mechanical mixture of 50 parts polyacrylonitrile and 50 parts of the above polymer and extruding the solution into a precipitating bath had a sticking temperature of above 200° C. and showed excellent affinity for acetate, wool, direct and vat dyes.

The resinous compositions or polymers of the invention are all compatible with each other, with polyacrylonitrile and with other acrylonitrile polymers containing 85 percent or more by weight of acrylonitrile, in all proportions, but the most useful mixtures comprise from 5 to 95 parts by weight of one or more of the polymers of the invention with from 95 to 5 parts by weight of polyacrylonitrile, good quality fibers being spinnable from such mixtures dissolved in one or more of the known acrylonitrile polymer solvents. The solutions or dopes of the polymers alone or in admixture with polyacrylonitrile or other acrylonitrile polymers, with or without added fillers, pigments, dyes, plasticizers, etc., as desired, can also be coated onto a smooth surface to give flexible and tough films and sheet materials, which are useful for photographic film support and other purposes. Such compositions are also useful as overcoating materials. The concentration of polymer in the dopes can be varied depending upon the intended uses, for example, from 25 to 40 percent or even higher, where the dope is to be used for spinning fibers.

Other solvents which can be used for the preparation of fibers and coating compositions, etc. from the new resinous compositions or polymers of the invention, and mixtures thereof with each other with polyacrylonitrile or with acrylonitrile polymers containing 85 percent or more of acrylonitrile, include ethylene carbonate, ethylene carbamate, γ-butyrolactone, N-methyl-2-pyrrolidone, N,N-dimethyl cyanamide, N,N-dimethyl cyanoacetamide, N,N-dimethyl-β-cyanopropionamide, glycolonitrile (formaldehyde cyanohydrin), malononitrile, ethylene cyanohydrin, dimethyl sulfoxide, dimethyl sulfone, tetramethylene sulfoxide, N-formyl pyrrolidone, N-formyl morpholine, N,N'-tetramethylene methane-phosphonamide, and the like. Generally speaking, I have found that N,N-dimethyl formamide and N,N-dimethyl acetamide are particularly advantageous solvents.

What I claim is:

1. A process for preparing resinous compositions comprising heating in the presence of a polymerization catalyst a dispersion of from 50 to 5 parts by weight of a monomer (1) selected from the group consisting of N-vinyl succinimide and from those represented by the following general formulas:

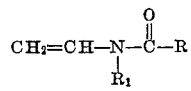

and

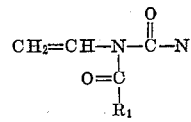

wherein R and $R_1$ each represents a member selected from the group consisting of an alkyl group containing from 1 to 3 carbon atoms and a phenyl group, until the monomer member has substantially completely polymerized, adding to the polymerization mixture containing the unseparated polymer from 50 to 95 parts by weight of a monomer mixture (2) consisting of from 85.0 to 99.5 percent by weight of acrylonitrile and from 15.0 to 0.5 percent by weight of a different monoethylenically unsaturated compound containing a

group, and heating the reaction mixture until the monomer mixture has polymerized.

2. A process for preparing resinous compositions comprising heating in the presence of a polymerization catalyst a dispersion of from 40 to 5 parts by weight of N-vinyl succinimide, until the N-vinyl succinimide has substantially completely homopolymerized, adding to the polymerization reaction mixture containing the unseparated homopolymer from 60 to 95 parts by weight of a monomer mixture consisting of from 85.0 to 99.5 percent by weight of acrylonitrile and from 15.0 to 0.5 percent by weight of a different monoethylenically unsaturated, polymerizable compound containing a

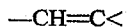

group, and heating the reaction mixture until the added monomers have polymerized.

3. A process for preparing resinous compositions comprising heating in the presence of a peroxide polymerization catalyst a dispersion of from 40 to 5 parts by weight of N-vinyl diacetamide, until the N-vinyl diacetamide has substantially completely homopolymerized, adding to the polymerization reaction mixture containing the unseparated homopolymer from 60 to 95 parts by weight of a monomer mixture consisting of from 15.0 to 0.5% by weight of a monoethylenically unsaturated polymerizable compound other than acrylonitrile and containing a —CH=C< group and from 85.0 to 99.5% by weight of acrylonitrile, and heating the reaction mixture until the added acrylonitrile has polymerized.

4. A process for preparing resinous compositions comprising heating in the presence of a peroxide polymerization catalyst a dispersion of from 40 to 5 parts by weight of N-vinyl-N-methylacetamide, until the N-vinyl-N-methylacetamide has substantially completely homopolymerized, adding to the polymerization reaction mixture containing the unseparated homopolymer from 60 to 95 parts of a monomer mixture consisting of from 85.0 to 99.5 percent by weight of acrylonitrile and from 15.0 to 0.5 percent by weight of methyl acrylate, and heating the reaction mixture until the added monomers have polymerized.

5. A process for preparing resinous compositions comprising heating in the presence of a peroxide polymerization catalyst from 40 to 5 parts by weight of N-vinyl succinimide, until the N-vinyl succinimide has substantially completely homopolymerized, adding to the polymerization reaction mixture containing the unseparated homopolymer from 60 to 95 parts by weight of a monomer mixture consisting of 85.0 to 99.5 percent by weight of acrylonitrile and from 15.0 to 0.5 percent by weight of vinyl acetate, and heating the reaction mixture until the added monomers have polymerized.

6. A process for preparing resinous compositions comprising heating in the presence of a peroxide polymerization catalyst a dispersion of from 40 to 5 parts by weight of N-vinyl succinimide, until the N-vinyl succinimide has substantially completely homopolymerized, adding to the polymerization reaction mixture containing the unseparated homopolymer from 60 to 95 parts by weight of a monomer mixture consisting of 85.0 to 99.5% by weight of acrylonitrile and from 15.0 to 0.5% by weight of a different monoethylenically unsaturated polymerizable compound containing a —CH=C< group, and heating the reaction mixture until the added acrylonitrile has polymerized.

7. A process for preparing resinous compositions comprising heating in the presence of a polymerization catalyst a dispersion of from 40 to 5 parts by weight of an N-vinyl acylamide of from 6 to 10 carbon atoms wherein the acyl groups contain from 1 to 3 carbon atoms until the monomer has polymerized to yield a polymerization mixture containing a predominant amount of homopolymer, adding to the polymerization mixture containing the unseparated homopolymer from 60 to 95 parts by weight of a monomer mixture consisting of 85.0 to 99.5% by weight of acrylonitrile and from 15.0 to 0.5% by weight of a different monoethylenically unsaturated compound containing a —CH=C< group and heating the resulting mixture until the added acrylonitrile has polymerized.

8. A process for preparing resinous compositions comprising heating in the presence of a polymerization catalyst a dispersion of from 40 to 5 parts by weight of an N-vinyl amide containing not more than 6 carbon atoms until the monomer has substantially homopolymerized, adding to the polymerization mixture containing the unseparated homopolymer from 60 to 95 parts by weight of a monomer mixture consisting of 85.0 to 99.5% by weight of acrylonitrile and from 15.0 to 0.5 parts by weight of a different monoethylenically unsaturated polymerizable compound containing a —CH=C< group, and heating the reaction mixture until the added monomer mixture has polymerized.

9. A process for preparing resinous compositions comprising heating in the presence of a polymerization catalyst, a dispersion of from 40 to 5 parts by weight of an N-vinyl-N-alkylamide wherein the acyl group contains from 2 to 4 carbon atoms and the alkyl group contains from 1 to 3 carbon atoms, until the monomer has substantially polymerized, adding to the polymerization mixture containing the unseparated homopolymer from 60 to 95 parts by weight of a monomer mixture consisting of from 85.0 to 99.5% by weight of acrylonitrile and from 15.0 to 0.5% by weight of a different monoethylenically unsaturated polymerizable compound containing a —CH=C< group and heating the reaction mixture until the added monomers have polymerized.

10. A modified polymer having the structure and composition of a polymer obtained by the process of claim 1.

11. A modified polymer having the structure and composition of a polymer obtained according to the process of claim 3.

12. A modified polymer having the structure and composition of a polymer obtained according to the process of claim 8.

13. A modified polymer having the structure and composition of a polymer prepared in accordance with claim 4.

14. A modified polymer having the structure and composition of a polymer obtained according to the process of claim 5.

15. A modified polymer having the structure and composition of a polymer obtained according to the process of claim 6.

16. A process for preparing resinous compositions comprising heating in the presence of a polymerization catalyst a dispersion of from 50 to 5 parts by weight of N-vinyl succinimide until the monomer has substantially polymerized, adding to the polymerization mixture containing the homopolymer from 50 to 95 parts by weight of a monomer mixture consisting of 85.0 to 99.5% by weight of acrylonitrile and from 15.0 to 0.5% by weight of a different monoethylenically unsaturated polymerizable compound containing a —CH=C< group and heating the resulting reaction mixture until the added monomers have polymerized.

No references cited.